UNITED STATES PATENT OFFICE.

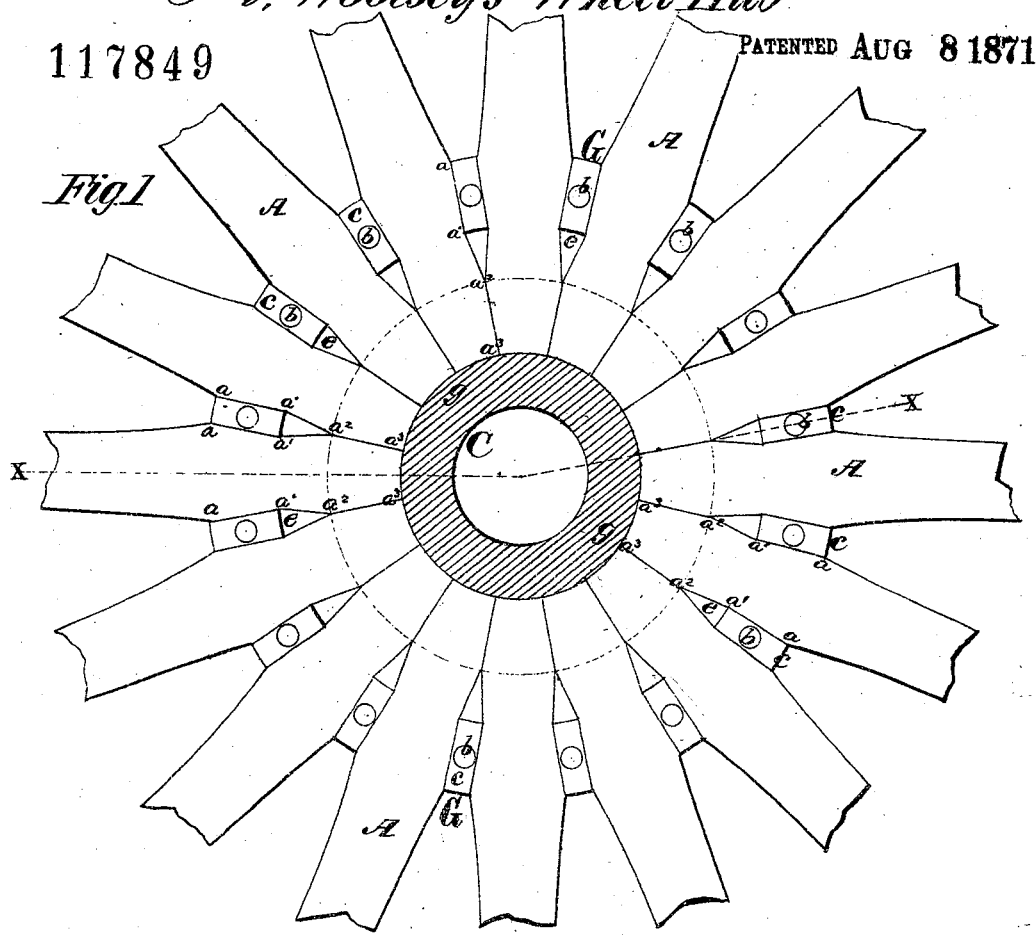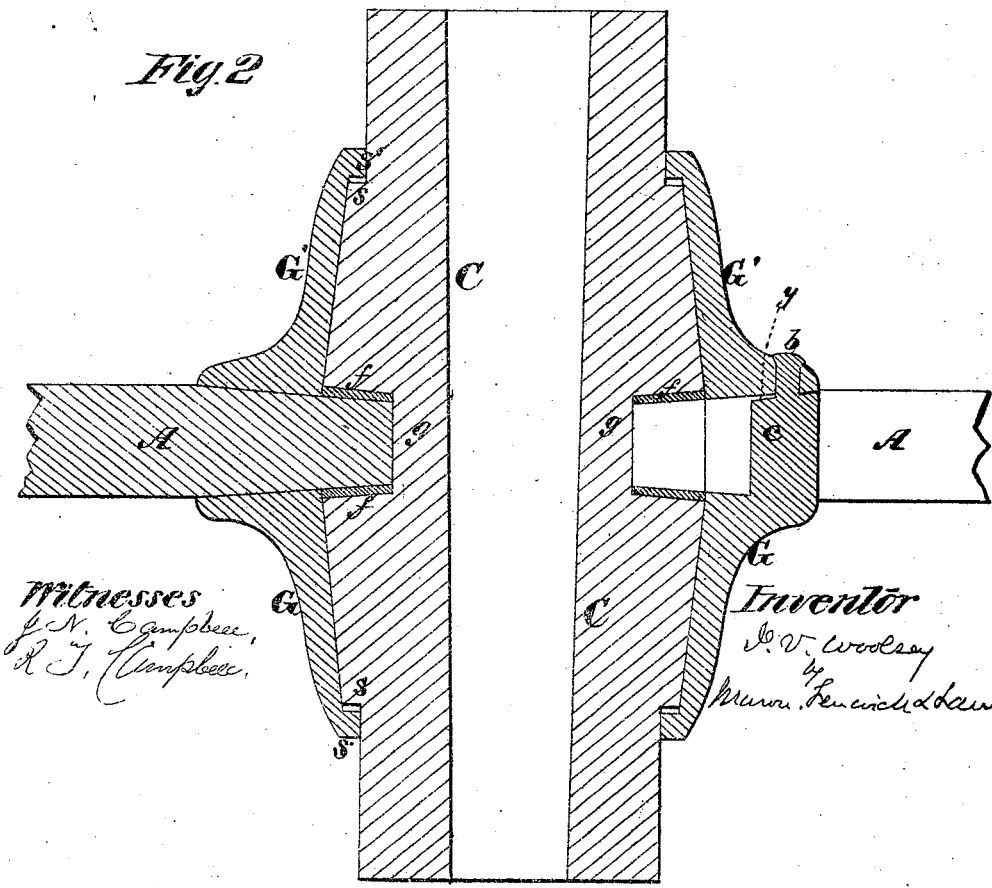

JOHNSTON V. WOOLSEY, OF SANDUSKY, OHIO.

IMPROVEMENT IN WHEEL-HUBS.

Specification forming part of Letters Patent No. 117,849, dated August 8, 1871.

*To all whom it may concern:*

Be it known that I, JOHNSTON V. WOOLSEY, of Sandusky, in the county of Erie and State of Ohio, have invented a new and Improved Wheel-Hub; and I do hereby declare that the following is a full, clear, and exact description thereof, reference being had to the accompanying drawing making part of this specification, in which—

Figure 1 is a cross-section through the hub on one side of the spokes. Fig. 2 is a longitudinal section through the hub taken in the course indicated by dotted line $x$ $x$ in Fig. 1.

Similar letters of reference indicate corresponding parts in the several figures.

This invention relates to an improved mode of constructing combined wood and metal hubs for vehicles, whereby a very light and substantial hub is produced, the metal parts of which are adapted for being tightened on the spokes should the latter become loose from any cause, as will be hereinafter explained.

The following description of my invention will enable others skilled in the art to understand it.

In the accompanying drawing, C represents the wooden portion of the hub, which has an annular groove formed into its outer surface at or near the middle of its length, which groove flares outwardly and may have leather rings $f$ $f$ applied to it, as shown in Fig. 1. From this annular groove the outer surface of the hub is tapered as far as abrupt shoulders $s$ $s$, and from these shoulders to the extremities of the hub the surfaces are cylindrical. G G' are two metal collars, which, when they are driven firmly upon the tapered surfaces of the wooden portion C, and secured together by means of rivets, inclose between them and aid in confining the ends of the spokes A A rigidly in place. Both collars G G' have annular shoulders $s'$ $s'$ formed on them at their outer extremities, and both collars may present the same shape and size externally as shown in Fig. 2. The flange of the collar G has formed on its convex surface a number of partitions, $c$, the sides of each one of which are parallel to each other. These partitions or division lugs $c$ correspond in number to the number of spokes used, and are arranged equidistant from each other. The end of each partition $c$ is beveled, as at $y$, toward the axis of the hub, and has a rivet-pin, $b$, formed on it at an intermediate point between its outer and inner angles. The collar G' has holes through its flange corresponding in number to and adapted to receive the rivet-pins $b$. The inner beveled surfaces of the flanges of the two collars correspond to the beveled or flaring sides of the annular groove formed into the wooden section C, as shown in Fig. 2, so that when the spokes are driven home two of their tapered sides have bearings from the peripheries of the flanges of said collars to their inner extremities, which abut against the base of said annular groove, as shown in Fig. 2. That portion of the end or foot of each spoke A which is received between the two metallic collars and into the wooden partition C has two of its sides arched from $a$ to $a^2$, and tapered from $a^2$ to its inner extremity. The sides from $a$ to $a^1$ correspond to and are received between the surfaces of the partitions on collar G, while the surfaces from $a^2$ to $a^3$ are tapered so as to receive against them the corresponding surfaces of adjacent spokes. The lines from $a^2$ to $a^3$, when the spokes are all in the hub, radiate from the axis of the hub, and if prolonged would intersect the centers of the partitions $c$ and their rivet-pins $b$. Thus it will be seen that the thickness of each spoke between the points $a^2$ $a^3$ is greater than the space between two of the partitions $c$; consequently the wood will be forcibly compressed in driving a spoke home, and will then expand again, as shown in Fig. 1, leaving between the points or angles $a^1$ $a^2$, every two adjoining hubs, an angular space, $e$, into which a wedge may be driven, if desired. Fig. 2 represents the spokes driven into their places, and the two collars G G' riveted together. It will be seen that the two collars only touch each other at their peripheries—that is to say, by beveling the ends of the partitions $c$, as at $y$, these partitions touch the flange of the collar G' at its outer edge. This allows the collar to be set up, should the spokes contract and become loose, by spreading the heads of the rivets $b$; and it also allows the collars to clamp the spokes with an elastic force, which operates constantly to firmly hold the spokes. The packing $f$ $f$, which may be made of leather, rubber, or of any other soft yielding material, allows the tapered ends of the spokes to seat themselves snugly into the annular groove formed in the wooden section C. This packing may, however, be omitted if the said groove and ends of the spokes are made to fit each other tightly.

In clamping the collars together by the act of mashing down the ends of rivets $b$, the action of the shoulders $s'$ on the shoulders $s$ will start the fibers of the wood and cause the sides of the annular groove in the section C to hug with considerable force the ends of all the spokes.

I am aware that wheels for carriages have been constructed before my invention wherein the hubs were made partly of wood and partly of metal; and I do not claim, broadly, this combination.

What I do claim as new, and desire to secure by Letters Patent, is—

1. The combination of the wood central portion C grooved at $g$ all round, the metal collars G G' with rectangular partitions $c$ and with rivets $b$, and the spokes A with tapered surfaces $a$ $a^1$ and $a^2$ $a^3$, the latter bearing against one another and the former against the rectangular partitions, all arranged substantially in the manner and for the purpose described.

2. The shoulders $s$ $s$ formed on the grooved wooden hub C, in combination with the shoulders $s'$ $s'$ formed in the metal clamping-collars G G', one of which has rectangular partitions $c$, substantially as described.

3. The partitions $c$ formed on the collar G, and having their ends beveled, as at Y, as shown, for the purpose set forth.

JOHNSTON V. WOOLSEY.

Witnesses:
   S. C. WHEELER,
   C. H. HUBBARD.